United States Patent [19]

Seme, Jr. et al.

[11] Patent Number: 4,966,504

[45] Date of Patent: Oct. 30, 1990

[54] ELECTRODE TIP DRESSER AND HOLDER ASSEMBLY

[75] Inventors: Joseph P. Seme, Jr., Hudson; Charles R. Balog, Litchfield; Robert Janashak, Garfield Heights, all of Ohio

[73] Assignee: Sem-Torq, Inc., Bedford, Ohio

[21] Appl. No.: 278,249

[22] Filed: Nov. 30, 1988

[51] Int. Cl.⁵ .......................... B23C 3/12; B23C 5/14
[52] U.S. Cl. .......................... 409/140; 407/1; 407/42; 30/375; 409/218
[58] Field of Search ............... 409/180, 181, 139, 140, 409/218; 219/119; 407/30, 42, 62, 1; 30/351, 357, 494, 495; 408/211, 203.5

[56] References Cited

U.S. PATENT DOCUMENTS

| | | | |
|---|---|---|---|
| 2,286,931 | 6/1942 | Radeke | 409/181 X |
| 2,930,289 | 3/1960 | Swarts | 409/181 X |
| 3,232,145 | 2/1966 | Wilson | 408/211 X |
| 3,820,437 | 6/1974 | Dyer et al. | 219/119 X |
| 4,578,005 | 3/1986 | Fuse et al. | 409/140 |
| 4,676,446 | 8/1988 | Nishiwaki | 408/211 X |

FOREIGN PATENT DOCUMENTS 624590 6/1949 United Kingdom .............. 409/140

*Primary Examiner*—Steven C. Bishop
*Attorney, Agent, or Firm*—Renner, Otto, Boisselle & Sklar

[57] ABSTRACT

An electrode tip dresser which is comprised of a pair of interlocking cutter blades. A rotatable holder is provided for assisting in securing the blades to each other. A clamping mechanism is provided to releasably secure both the blades and the rotatable holder in such a manner that they may be driven by a power source. The blades, when interlocked, expose two cutting and two burnishing edges on each side of the holder and blade assembly. The clamping mechanism is designed to lock the holder and blade assembly in place for rotation by employing a locking cam clamp which is engaged when a toggle is overthrown.

10 Claims, 4 Drawing Sheets

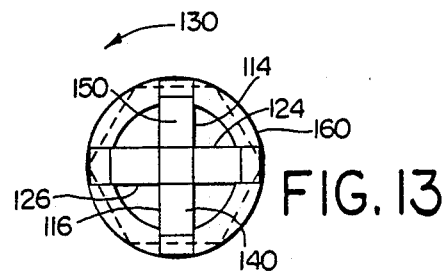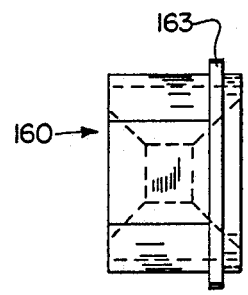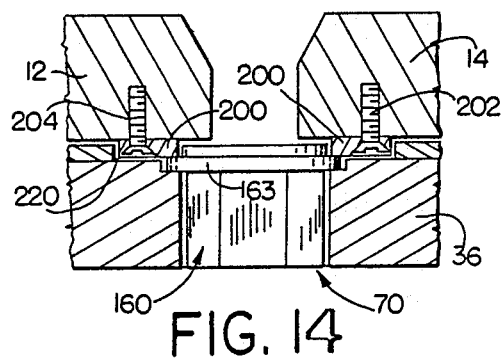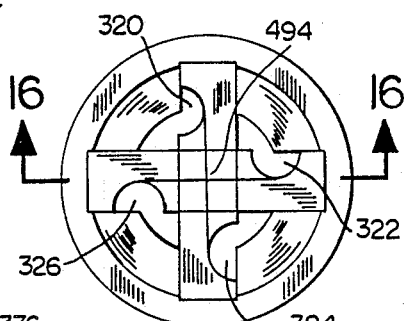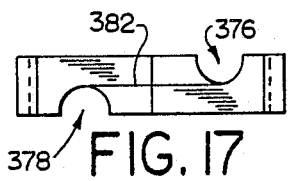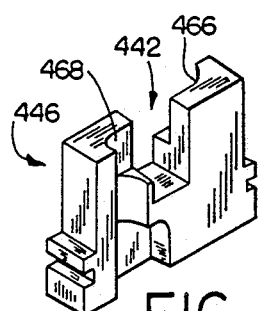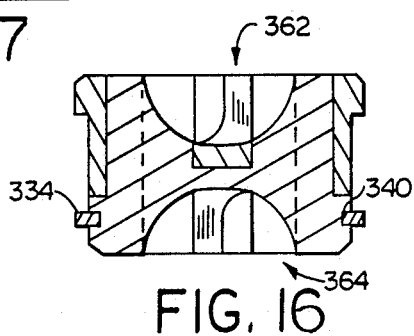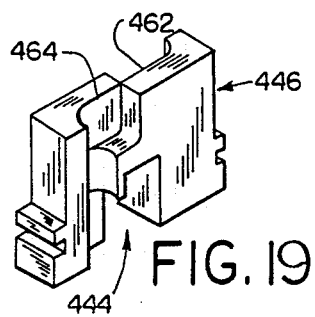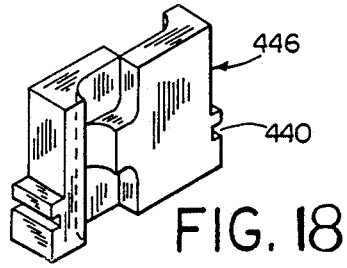

ELECTRODE TIP DRESSER AND HOLDER ASSEMBLY

DISCLOSURE

The present invention generally relates to automatic electrode dressers, the blades used in such dressers, the holder used for securing the blades and the mechanism by which both the blades and the blade holder are rotatably mounted in an automatic electrode dresser. The device is particularly suited for simultaneously and automatically dressing dual electrode tips.

BACKGROUND OF THE INVENTION

During welding operations, electrode tips are subject to wear, mushrooming, and general deformation. As tips wear they are subject to heat build-up and, given sufficient wear, electrode tips produce either poor welds or fail to weld at all. To prevent the conditions that effect adverse welding performance, electrode tips have commonly either been replaced or dressed. Replacing worn electrodes is often not only a time consuming, but a costly proposition; dressing electrode tips has been found to be not only a viable, but sensible alternative. A properly dressed electrode tip will result in not only reduced energy consumption, but uniform welds, reduced production and maintenance downtime and an extension of useful electrode life.

Typically, in the past, electrode tips have been dressed either by hand or with the use of an automatic electrode tip cutter. The difficulty with hand dressing of electrode tips is that the procedure lacks considerably in accuracy and the constant risk is run of removing too much tip material thereby reducing tip life or dressing the tips asymmetrically such that they no longer properly mate because the original shape of the tip has been lost.

Further, in hand dressing of electrode tips, machine downtime is a consideration of some magnitude and although various type ratchet apparatus have been employed, accuracy of the final dressed tip has suffered virtually to the same degree that is encountered with hand filing or sanding. Probably the best of the various alternatives to electrode tip dressing is the use of automatic cutters. Downtime is substantially reduced, the electrode tips do not have to be removed from the welding machine and the tips may be dressed with considerably more frequency and before the electrode face is seriously deformed.

A well dressed electrode tip provides more uniform current density, better welds and extended electrode life. Several types of electrode tip cutters have been employed in automatic dressers in the past. Essentially these are a blade type cutter and a flanged cone type cutter. This latter type cutter normally has sharpened edges, but is essentially solid in overall configuration. One of the problems encountered with the solid type cutters is that the end of the tool is difficult to resharpen and it is not readily adaptable to different types of dresser tip configurations.

Of the blade type cutters, adaptability to accommodate various tip shapes existed. The blades could also be removed for sharpening and were normally designed to float within a blade holder so that the electrode tip could be centered in the center of the cutter. Some adaptations have employed a cutter with three cutting surfaces although these were somewhat more difficult to sharpen. In the past some difficulty has been encountered in reinserting the cutters into the holder and as the number of blades on the cutter increased a certain amount of chatter was encountered which affected the dressing operation.

SUMMARY OF THE INVENTION

An electrode tip dresser according to the present invention is primarily for use in dressing dual electrode tips simultaneously. The dresser is driven by a horizontally positioned motor. The motor may be either pneumatic or electric and is geared and adapted to drive a set of cutter blades mounted in a tool rotatable 360° about the motor position. The rotatable tool has a clamping mechanism and a spring loaded flotation mount which accepts a cutter holder containing the cutter blades.

For ease of removing and reinstalling the cutter blades and holder in a rotational clamp or mount, an integral funnel tip guide is provided as part of the clamp. A four-bladed cutter is utilized which is comprised of two essentially similar elongate blades mated to each other. The blades thus present either four cutting or two cutting and two burnishing edges to each electrode tip that is to be dressed. The two and two configuration is preferred. The four-blade cutter of one embodiment of the invention is designed to dress electrode tips in a zero to 45° range from the centerline of the cutter.

The funnel guide has a toggle action locking clamp which locks the holder and blades into the motor driven chuck on the dressing tool. The chuck may be either circular or hexagonal and the holder is correspondingly shaped. Other forms, of course, may be utilized.

The gear train for driving the holder and the blades is contained within a high strength aluminum cast housing and high strength cast aluminum is also used for the pivot points for the toggle action clamp. An object of the present invention is to provide an electrode tip dresser which is particularly adaptable to use with robotic welding equipment.

The blades are configured such that chip build-up is virtually eliminated in the area of the cutter blade. The two burnishing edges which are in contact with each electrode tip being dressed help to stabilize the tip and eliminate chatter which could otherwise potentially be introduced by four cutting blades or even the two cutting blades which are in juxtaposition with the burnishing edges.

An object of the blade holder design is to provide a holder which is readily disassembled and employs snap rings for easy disassembly and blade removal for replacement or sharpening. The holder in one embodiment of the invention is designed in multiple parts and in another is designed to have blades readily slid into and out of position and be contained within locking grooves on the interior of the blade holder.

The toggle mechanism which holds the blade and cutter for rotation within the rotational tool is an overthrow cam which assures a positive locking force is exerted on the holder retaining funnel guide.

Although the invention is particularly adapted for use in robotic applications, the unique four-blade design is readily adaptable to employment in hand operated tools utilized in tip dressing as well as other non-robotic applications. Thus, the electrode dresser blades and holder are adaptable for use with any style of gun, be it pincher or straight action, manual or robotic.

The foregoing and other features of the invention are not only more fully described in subsequent portions of the specification, but are particularly pointed out in the claims. The following description as well as the annexed drawings set forth in detail illustrative embodiments of the invention. The embodiments are merely indicative of some of the ways in which the principles of the invention may be utilized.

BRIEF DESCRIPTION OF THE DRAWINGS

In the annexed drawings:

FIG. 12 is a side view of the blades of FIGS. 10 and 11 when they are placed together in a holder, extraneous phantom lines being omitted for clarity;

FIG. 13 is a bottom view of the assembled blades shown in FIG. 12;

FIG. 14 is a cut away view of a holder located within the rotation tool;

FIG. 15 is a top view of a pair of assembled cutter blades in which blade chip clearance is shown;

FIG. 16 is a view generally along line 16—16 of FIG. 15, lines being added and omitted so that the Figure is illustrative;

FIG. 17 is a top view of a cutter blade having chip clearance portions;

FIG. 18 is a perspective view of a cutter blade blank;

FIG. 19 is a perspective view of an unfinished cutter blade made from a blank such as that shown in FIG. 18, the scale having been reduced;

FIG. 20 is a perspective view of a cutter blade cut from a blank such as shown in FIG. 18, the scale having been reduced, the blade of FIG. 20 being designed to mate with that shown in FIG. 19;

DETAILED DESCRIPTION OF THE INVENTION

Figure 1:
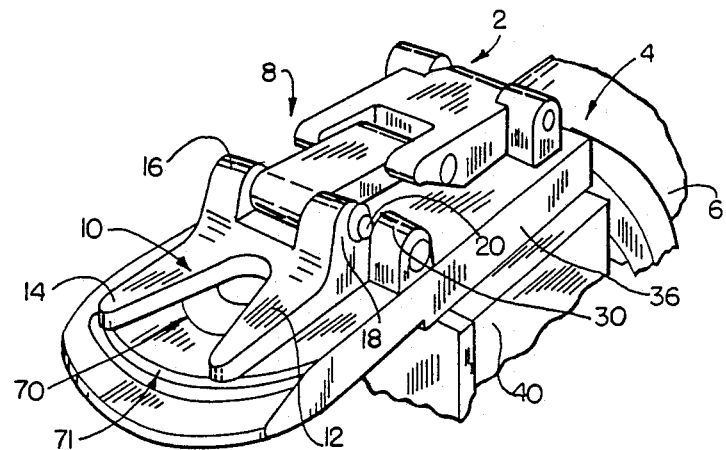
FIG. 1 is a perspective view of an automatic tip dresser, portions being broken away to more poignantly illustrate the rotational tool.

With reference initially to FIG. 1, a rotational tool 2 is shown. The tool 2 is connected to a motor 4 which is shown, for illustrative purposes, only fragmentarily. The rotational tool is mounted to the motor housing 6 for 360° rotational movement.

The drive mechanism interconnecting the motor and the rotational tool is normally comprised of worm, bevel and reduction gears in a conventional manner.

In FIG. 1 as well as in FIGS. 2–6, the toggle action locking clamp 8 is clearly illustrated. The locking clamp terminates at one end in a funnel guide 10 which is comprised of two locking arms 12 and 14. The funnel guide is comprised of two upstanding crank arms 16 and 18 through which a pin 20 passes.

Funnel guide 10 also has a rearwardly extending portion 22 which is apertured to accept and rotate about pin 24 which is secured through ears 30 and 32 which emanate from toggle base 36.

Toggle base 36 sits atop of gear housing 40. It will be appreciated and can readily be seen in FIGS. 2–5 that when the locking mechanism is in its closed position as is shown in those figures, pin 20 lies forwardly of pin 24. Pin 20 goes through toggle extension 49 which is connected to handle 50 by pin 51. Extension 49 and handle 50 are adapted to rotate about pin 51 when the handle is lifted in the direction of arrow 60 shown in FIG. 2. When the handle is in the closed position its rounded bottom portion 52 abuts the top of housing 40. When the mechanism is closed by moving the handle 50 rotationally about pin 53 which is secured through ears 56, 57 on the base 36 overlying the housing 40, it can be seen that the funnel guide is locked in a down position overlying the chuck area 70.

Figure 2:
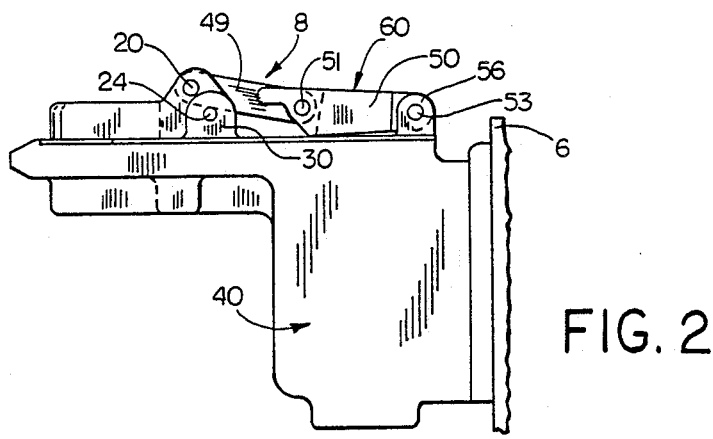
FIG. 2 is a side view of the tip dresser shown in FIG. 1.
Figure 3:
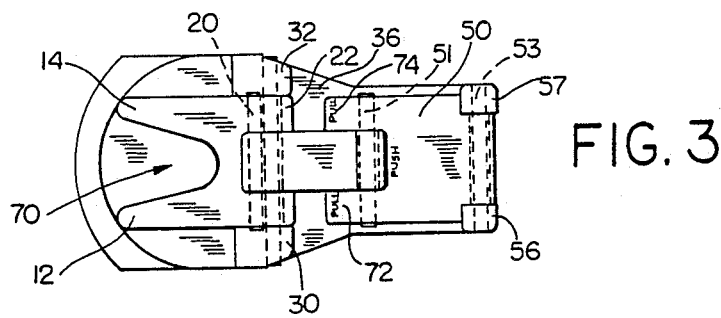
FIG. 3 is a top view of the rotational tool of the instant invention.
Figure 4:
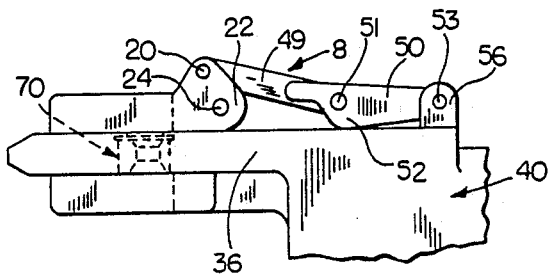
FIG. 4 is a side view essentially similar to that of FIG. 2 but with the outside pivot being removed for clarity.
Figure 5:
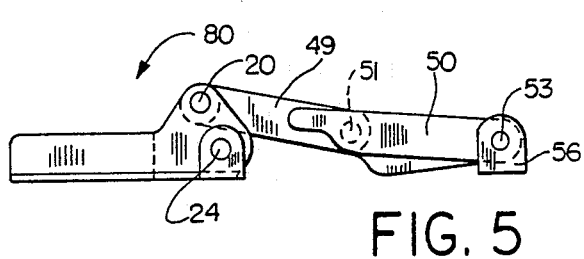
FIG. 5 is a side view of the latch portion of the toggle action locking clamp in closed position.

If it is desired to release the funnel guide from its locking position it is only necessary to pull upwardly in the direction 60 as is shown in FIG. 2. This is readily accomplished by grasping either of the pull tabs 72 or 74 on the front portion of handle 50 and lifting the handle in the direction of arrow 60.

Figure 6:
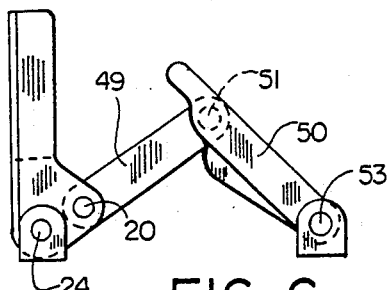
FIG. 6 is a view of the toggle action clamp in open position.

When the toggle action locking clamp is in its open position as is shown in FIG. 6, the funnel guide assumes a substantially vertical position with respect to the base. The extension or link 49 and handle 50 form a generally inverted V configuration. It will be seen that in this position the three pins 20, 24 and 51 are generally linearly aligned.

Pin 53, which serves as the pivot point about which the rear of the handle 50 moves, is secured in upstanding ears or lugs 56 and 57 at the rearward portion of the base 36. When the handle is pushed in the area indicated by the word "Push" in FIG. 3, the toggle action locking clamp can be closed and substantially continual closing force is exerted through the articulated linkage in the direction 80 (shown in FIG. 5) on the funnel guide. This locking force is maintained from the pin holding ears 56, 57 all the way through pin 53, handle 50, pin 51, link 49 and pin 20 located through the upstanding vertical portion of the funnel guide. It will readily be appreciated that the rear portion of the guide is prevented from lifting due to its attachment by pin 24 through ears 30 which are attached to base 36. It is thus seen that the chuck area may be cleared and readily accessed or, alternatively, if a cutting blade and collar are inserted in the chuck area, such collar and blade may be locked against vertical displacement from the base area.

Figure 10:
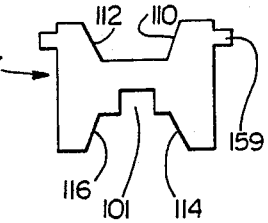
FIG. 10 is a side view of a cutter blade.
Figure 11:
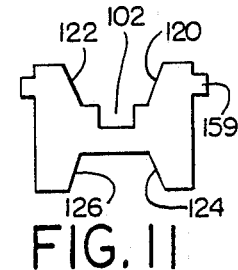
FIG. 11 is a side view of a cutter blade designed to mate with the blade of FIG. 10.
Figure 7:
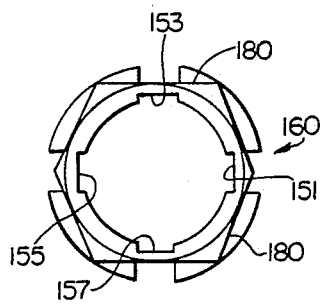
FIG. 7 is a bottom view of a blade holder.
Figure 8:
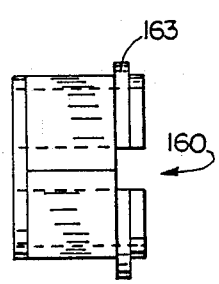
FIG. 8 is a side view of the blade holder of FIG. 7.
Figure 9:
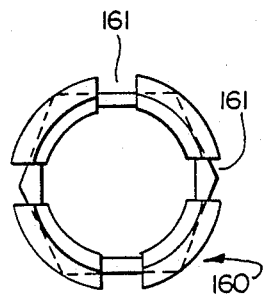
FIG. 9 is a top view of the holder shown in FIGS. 7 and 8.

The just described locking mechanism which is carried on a rotable housing in communication with either an electric or pneumatic motor is designed to accommodate a newly designed collar and cutting blade used for dressing welding electrode tips. One embodiment of a solid, unitary, one piece holder is best seen in FIGS. 7–9 and an illustrative blade configuration is shown in FIGS. 10 and 11. The blades of FIGS. 10 and 11 define notches 101 and 102. These notches are designed to mate with each other so that the two blades are put together in a cross-shaped configuration as is shown in FIGS. 12 and 13. The notches are transverse to the central axis of rotation which bisects the blade. The blade shown in FIG. 10 is designed to have cutting edges ground into it at four areas indicated at points 110, 112, 114 and 116. The mating blade shown in FIG. 11 is adapted to have a cutting surface ground at edges 120, 122, 124 and 126.

As seen in FIG. 13, when the blades are rotated about their central axes of rotation in the direction of arrow 130, cutting portions 124 and 126 may be engaged with an electrode tip. Cutting edges 116 and 114 of the blade 117 shown in FIG. 10 do not cut when the holder and blade are rotated in the direction indicated in FIG. 13 since this blade is traveling in a direction counter to and away from its bottom cutting edges. Instead of serving a cutting function, a beveled portion in the areas of 140 and 150 of blade 117 would serve as a burnishing surface to prevent chattering of the cutting blades, collar and the electrode tip being dressed. Since it is understood that FIG. 13 is a bottom view, the reciprocal of the same type cutting-burnishing operations will take place on the other side of the blades and edge surfaces 120 and 122 will become burnishing surfaces whereas the portions shown at 110 and 112 will be cutting edges. Each individual blade is thus double sided and has two cutting edges on one side and two burnishing edges on its other side.

It can be seen that the substantially identical blades are designed to fit within holder 160 which is illustrated in FIGS. 7-9. In the illustration of FIGS. 7-9 the holder has a hexagonal shape defined by lock pads 180 which are designed to mate with a correspondingly shaped chuck carried in the chuck area of the rotational tool. Interiorly of the holder are axially oriented blade edge holding grooves 151, 153, 155 and 157. Blade tabs 159 fit into holder slots 161 and align circumferentially with external holder support rib or flange 163. Thus, the side edges of the blades are held from rotation by the holder grooves and slots. The blades are held from axial displacement when placed in the chuck as will be explained.

In FIG. 14 the holder 160 is shown mounted within the base 36 of the rotational tool in the chuck area 70. In FIG. 14 locking finger 14 and 12 are shown provided with a blade holder lock down ring 200 which is secured by screws 202 and 204 to the underside of the funnel guide. The ring shaped lock down is set into circumferential groove 220 in the base 36. The lock down ring overlaps flange 163 to secure the holder and blades in the chuck area 70.

Although not shown, the chuck is driven by appropriate driving means for rotation within the chuck area.

With reference now to FIGS. 15 and 16 it will be seen that two cutter blades are shown in their assembled mating alignment. On the blades shown provision has been made to facilitate shavings clearing the cutting area. These areas are shown generally at 320, 322, 324 and 326. Because of the capability of the cutting blades and collar being rotated 360° about a generally horizontal axis, the cut-outs in each side of each blade generally go all the way through from the top to the bottom of the blade. This provision allows shavings to drop free of the cutter and thus limit interference with the cutting dressing operation regardless of the orientation of the tool.

In FIG. 16 snap ring 334 is shown disposed about the lower periphery of the cutting blades. The snap ring is situated in groove 340 at the lower portion of the cutting blades. In the blade shown in FIG. 16 it will be noticed that a dome-shaped cutting configuration shown generally on both sides of the blade at 362 and 364 has been provided. The shape of the cutting surface can of course be varied to accommodate various electrode tip configurations whether they are rounded, tapered, flat, domed or otherwise configured.

FIG. 17 shows a top view of a tool steel cutter blade having the aforementioned semicircular notches which assist in preventing chip or burr build-up. These notches are indicated generally at 376 and 378. It can be seen from FIG. 17 that the bottom of the notches are cut to a midline 382 which runs transverse of the cutter blade.

Figure 21:
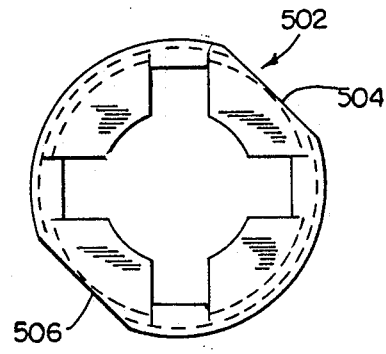
FIG. 21 is a top view of a holder assembly designed for use with the invention.
Figure 22:
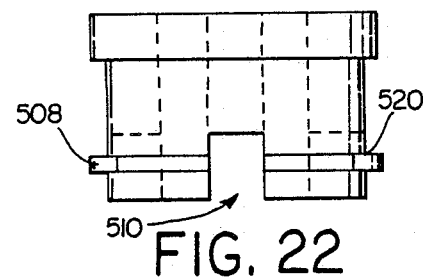
FIG. 22 is a side view of the holder shown in FIG. 21.

With reference now to FIGS. 18, 19 and 20, a cutter blade which is particularly suitable for use in pneumatically operated tools is shown. FIG. 18 shows a blank blade that has been partially machined. The blank has a snap ring groove 440 which serves the same purpose as snap ring groove 340 shown in FIG. 16. One end of the blank is designed to be machined in such a manner that a top interlocking groove, as is shown in FIG. 20 at 442, is formed. Groove 442 is designed to mate with corresponding groove 444 in the bottom of the blade shown in FIG. 19. The cutter blades are thus designed to interlock. As has been explained previously, a rotatable collar which may be either a single piece or a multiple plate piece unit is designed to fit about the periphery 446 of the blades. This collar and the blades are easily inserted into a chuck of a tip dresser. Another holder suitable for use with the blades and the invention is shown in FIGS. 21 and 22. The collar and blades may be clamped in and releasably secured by the hold down mechanism in cooperation with the chuck in the rotatable tool as has also been previously explained.

Referring again to FIGS. 19 and 20, cutting edges may be machined in areas 462, 464, 466 and 468. If the blades of FIGS. 19 and 20 were merely mated with cutting edges at 462, 464, 466 and 468, it will be appreciated that four cutting edges would be exposed to the tip which is to be dressed. This is not necessarily the most desirable configuration since excessive chatter may be introduced in the dressing operation between the electrode tip and the blades. Accordingly, it has been found better to machine the cutting blades such that two cutting and two burnishing edges are exposed to each of the electrode tips being dressed. This may be accomplished by taking similar blanks and machining two cutting edges on each end of the blank so that each blade has four total cutting edges. When two blades are inverted and mated there is a total of eight cutting edges, but because of the reversal of the blades, regardless of the direction of rotation of the tool only two edges on either end of the two blade combination will cut, the other two will run reverse because of the 180° flipflopping of the blades to achieve mating relationship therebetween. These cutting edges running in reverse will effect burnishing.

Thus it will be appreciate that in the cutting operation for either of the two tips being pinched into either side of the dressing tool, two of the blade surfaces contacting an electrode tip have no effective cutting rake and two of the blade surfaces contacting that same tip do have a rake forming an effective cutting edge. This configuration on both sides of the mated cutter blades allows application of full pressure by the pinching tips and it is unnecessary to reduce pressure. This is particularly advantageous in robotic applications since it eliminates an additional programmed step into the operation of the welder to accommodate varying pressures between dressing the tool and the welding operation itself. It should be kept in mind that the dressing operation may be programmed into the operation of a robotic welding to occur with substantial frequency during dwell time and before the electrode tips get substantially out of their desired configuration. Further, there is little or no need for operator intervention or line shutdown when using the automatic electrode dresser of the instant invention.

The center of the blades is used also as a guide and that it too performs a burnishing function. An appreciation of this facility may probably best be seen in FIG. 16, but also in FIG. 15 where the center point of the blades is indicated at 494. The cutting burnishing feature of the mated blades can also be seen in the side view of a cutting blade shown in FIG. 23.

Figure 23:
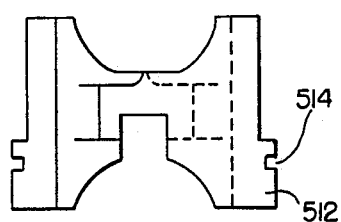
FIG. 23 is a view of one blade having a dome shaped cutting edge, the blade being configured for mating with a second blade of similar configuration.

The blades of the instant invention are designed to be accommodated within a holder such as that shown in FIGS. 21 and 22. The holder 502 is provided in the illustrated embodiment with flats 504 and 506 which are designed to be accommodated within a corresponding flat section of a chuck. In this illustration a snap ring 508 is shown which goes completely around the collar. In the area 510 shown in FIG. 22 a collar opening has been provided which accommodates leg sections 512 (shown in FIG. 23) of the cutter blade. Snap ring groove of the blade shown in FIG. 23 is indicated as groove 514. When the tab of the blade is inserted in the collar at point 510, the snap ring 508 lies not only in collar groove 520 but also in blade groove 514. The snap ring prevents axial movement of the blades relative to the holder. In this arrangement the transverse blade is narrower than the blade having grooved portions 512 so that its outer lower edges contact the interior of the collar.

The automatic electrode dresser of the instant invention is thus particularly adapted for use in robotic welding applications. A robot arm is simply programmed to periodically move over to the dressing machine and pinch the cutter blades on both sides thereby dressing both electrode tips at the same time. The tool is used most efficiently during a transfer or dwell time; the robot gun being programmed to bracket the automatic cutter after a minimum number of welds and before the electrode face is deformed. In the preferred embodiment two cutting blades are exposed to one electrode on one side of the cutting tool and two cutting blades are exposed to the other electrode tip at the opposite side. Additionally, at least one burnishing surface is exposed to each of the two electrode tips.

The floating movement of the collar and blades within the chuck accommodates and takes up electrode wear. The rotation tool in which the cutting blades are mounted may be set to any desired angular position to best accommodate the electrode tips.

The dual electrode dresser having two interlocking blades which may be removed and reversed and then replaced in the tool substantially extends the life of the blades before they have to be resharpened or replaced. It is readily understood that blade reversal will expose what previously were burnishing edges as cutting edges and vice versa. The blades themselves of course are easily sharpened since they may be taken apart after removal from the chuck and holder.

The unit is capable of dressing both electrodes at the same time and the blades rotate with sufficient velocity that this function may be accomplished in about two seconds or less. Because of the burnishing edges of the tool and the floating capability, the unit is usable with electrodes having a tip force of 300 lbs or better. The blades themselves are hardened and are of a material capable of dressing electrode material such as zirconium-copper and dispersion strengthened copper. The dressing area 71 (FIG. 1) is thin enough in top to bottom dimension to accommodate an electrode tip opening minimally in the one-inch range. The cutter blades themselves are of course designed so that the bottom of a cutting area accommodates the opening capabilities of the electrode tips that are being dressed.

The unit may be mounted for movement not only in 360° as aforementioned, but also for tilting and alignment along any of three axes. When an air motor is utilized the units are designed to be driven by available air line pressure normally in the 80 to 90 psi range. When air driven motors are utilized they are normally provided with proper filter and lubrication for smooth and long life operation. Chip removal provisions can also be readily accommodated by the instant invention because of the configurations of the blades in one embodiment of the invention and also through the provision of a separate air chip blow-off which can be used in association with the rotatable tool holder.

Although the invention has been shown and described with respect to several preferred embodiments, those skilled in the art will appreciate that various alterations and modifications can be made without departing from the scope or spirit of the invention defined in the following claims.

We claim:

1. An electrode tip dresser comprising a pair of interlocking cutter blades, a rotatable holder for securing said blades, and a clamping means for releasably securing both said blades and said rotatable holder, said blades having opposed ends and each of said blades having a cutting edge on one of the ends and a burnishing edge on the other end.

2. The tip dresser of claim 1, wherein said cutter blades are notched and said notches face each other in mating, interlocking relationship such that a cross-shaped pair of cutter blades is formed.

3. The tip dresser of claim 1, wherein said blades have sides and further wherein said rotatable holder is substantially cylindrical and interiorly grooved to receive the sides of the cutter blades.

4. An electrode tip dresser comprising a pair of interlocking cutter blades, a rotatable holder for securing said blades, and a clamping means for releasably securing both said blades and said rotatable holder, wherein each of the blades comprising the pair of interlocking blades has one cutting end and one burnishing end and wherein the cutting end of one blade is juxtaposed to the burnishing end of the other blade.

5. An electrode tip dresser comprising a pair of interlocking cutter blades, a rotatable holder for securing said blades, and a clamping means for releasably securing both said blades and said rotatable holder, wherein said clamping means comprises a toggle mechanism defining an overthrow, locking cam clamp.

6. An electrode tip dresser comprising a pair of interlocking cutter blades, a rotatable holder for securing said blades, and a clamping means for releasably securing both said blades and said rotatable holder wherein said blades have sides and wherein said rotatable holder is substantially cylindrical and interiorly grooved to receive the sides of the cutter blades and further wherein said holder is comprised of a multiplicity of sections, said sections releasably securing said blades and being releasably secured to each other by a ring.

7. A two-sided cutter blade assembly comprising a pair of interlocking blades for dressing electrode tips, said blades, when interlocked, exposing two cutting and two burnishing edges on each side of said assembly.

8. A notched, double-sided cutter blade for dressing electrode tips comprising at least two cutting edges on one side of said blade and at least two polishing edges on the other side.

9. The cutter blade of claim 8, wherein said blade is adapted for rotation about a central axis bisecting said blade from the cutting side to the burnishing side and further wherein said blade is centrally notched about the axis of rotation.

10. The cutter blade of claim 9, wherein said blade is notched transverse to the axis.

* * * * *